United States Patent
Schaffer

(10) Patent No.: US 6,213,256 B1
(45) Date of Patent: Apr. 10, 2001

(54) ELECTROMECHANICAL WHEEL BRAKE SYSTEM

(75) Inventor: Wolfram Schaffer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,434

(22) PCT Filed: Aug. 28, 1997

(86) PCT No.: PCT/DE97/01863

§ 371 Date: Jun. 7, 1999

§ 102(e) Date: Jun. 7, 1999

(87) PCT Pub. No.: WO98/25046

PCT Pub. Date: Jun. 11, 1998

(30) Foreign Application Priority Data

Dec. 5, 1996 (DE) .............................. 196 50 405

(51) Int. Cl.$^7$ .................................................. F16D 55/02
(52) U.S. Cl. ........................ 188/71.9; 188/156; 188/72.7; 188/72.8
(58) Field of Search .................... 188/71.9, 156, 188/157, 158, 72.1, 72.7, 72.8

(56) References Cited

U.S. PATENT DOCUMENTS

| | | | |
|---|---|---|---|
| 4,399,894 | * | 8/1983 | Tribe .................................. 188/71.9 |
| 4,802,558 | * | 2/1989 | Garnett ................................ 188/134 |
| 4,809,824 | * | 3/1989 | Fargier et al. ....................... 188/72.8 |
| 5,107,967 | * | 4/1992 | Fujita et al. ......................... 188/72.1 |
| 5,348,123 | * | 9/1994 | Takahashi et al. ................... 188/72.1 |
| 5,484,193 | * | 1/1996 | Fuller et al. ......................... 188/356 |
| 5,620,077 | * | 4/1997 | Richard ................................ 188/173 |
| 5,829,557 | * | 11/1998 | Halasy-Wimmer et al. ....... 188/72.1 |
| 5,931,268 | * | 8/1999 | Kingston et al. .................... 188/162 |

* cited by examiner

Primary Examiner—Robert J. Oberleitner
Assistant Examiner—Devon Kramer
(74) Attorney, Agent, or Firm—Ronald E. Greigg; Edwin E. Greigg

(57) ABSTRACT

An electromechanical wheel brake device with a screw link actuator that is supported in a floating caliper, and driven by an electric motor. The screw link actuator can press a frictional brake lining against one side of a brake disk. The floating caliper can press a second frictional brake lining against the other side of the brake disk by means of a reaction force. In order to release the wheel brake device in the event of a malfunction, the screw link actuator as self locking-free, supports both a spindle nut and a threaded spindle so that the spindle nut and threaded spindle they can rotate, and securing the threaded spindle against rotation by means of a releasable rotation prevention device. In the event of a malfunction, the rotation prevention device is released and the frictional brake lining that is pressed with force against the brake disk pushes the threaded spindle away from the brake disk, wherein the threaded spindle is set into rotation and moves away from the brake disk.

14 Claims, 1 Drawing Sheet

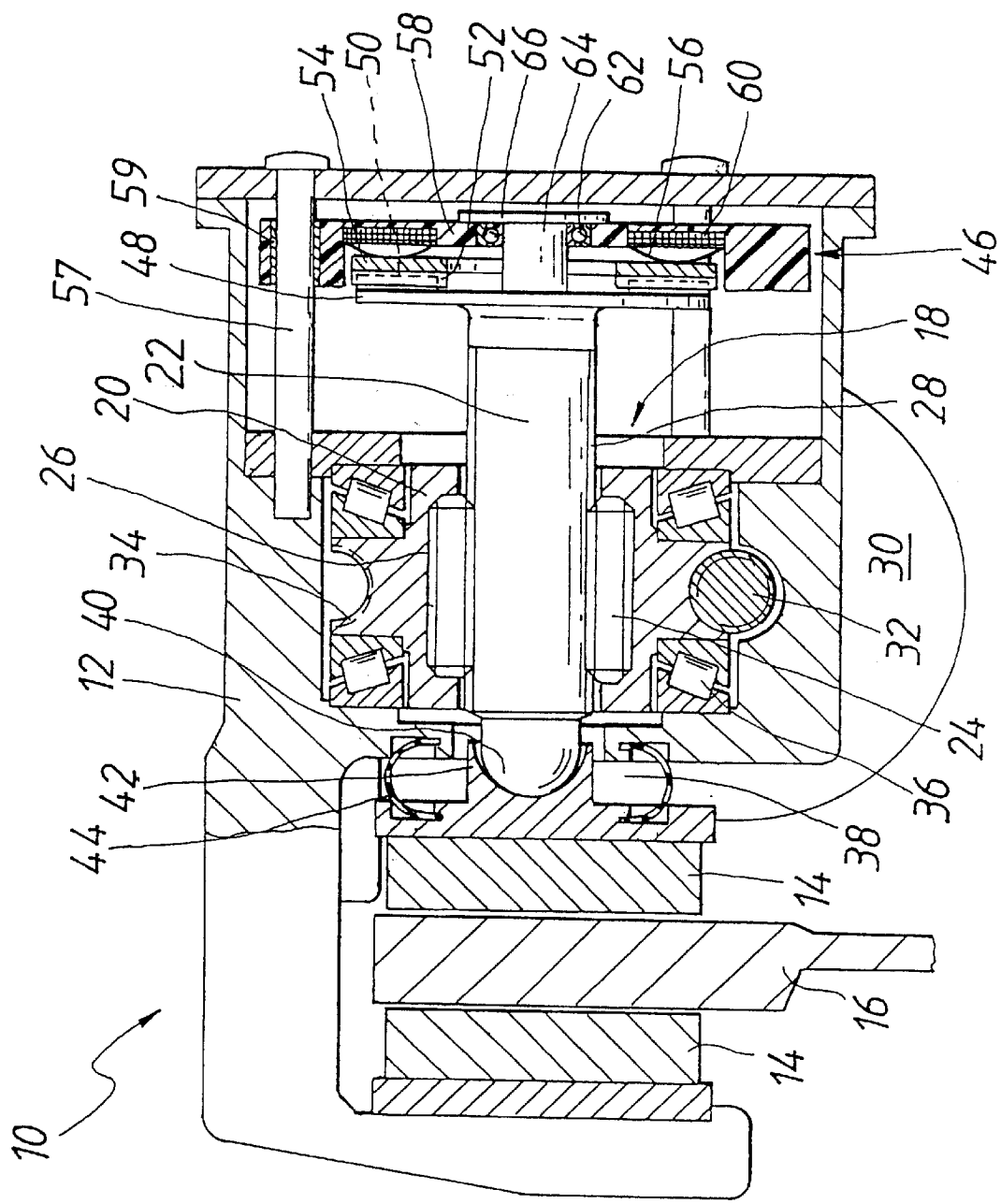

ELECTROMECHANICAL WHEEL BRAKE SYSTEM

PRIOR ART

The invention relates to an electromechanical wheel brake device for a motor vehicle.

A wheel brake device of this kind has been disclosed by WO 96/03301. The known wheel brake device is embodied as a disk brake. It has a brake caliper embodied as a floating caliper, in which two friction brake linings are disposed on both sides of a brake disk as a brake body, which can be set into rotation between them. In order to press one of the two frictional brake linings against the one side of the brake disk, the known wheel brake device has a screw link actuator whose threaded nut can be driven to rotate by an electric motor and whose threaded spindle can be pressed against the one frictional brake lining. The other frictional brake lining is pressed against the other side of the brake disk in a known manner by means of reaction forces, which occur when the one frictional brake lining is applied and are transmitted to the other frictional brake lining by the floating caliper.

In order to restore the known wheel brake device in the event of a malfunction, i.e. upon failure of a set of control electronics or upon failure of the electric motor or its power supply, the known wheel brake device has a restoring spring in the form of a spiral spring, which is supported against the brake caliper and engages the threaded spindle. This spiral spring is stressed upon actuation of the wheel brake device and releases the wheel brake device after the end of a braking procedure by rotating the threaded spindle back. The known wheel brake device has the disadvantage that its restoring spring is stressed with each brake actuation, for which energy is required, which reduces the efficiency of the known wheel brake device. Moreover, during actuation of the wheel brake device, its electric motor must additionally exert the spring force of the restoring spring and must maintain this during braking; correspondingly, the electric motor must be embodied as more powerful. A further disadvantage is that the restoring spring always moves the wheel brake device into its completely reset initial position so that an air play between the frictional brake linings and the brake disk becomes greater with increasing wear of the frictional brake linings. This extends an advancing path and lengthens an advancing time until the frictional brake linings come into contact with the brake disk. Likewise, the spring force of the restoring spring, which must be overcome for the braking, rises with increasing wear of the frictional brake linings, which further impairs the efficiency of the wheel brake device and requires a sufficiently powerful and durable electric motor.

ADVANTAGES OF THE INVENTION

The electromechanical wheel brake device according to the invention, has a self locking-free screw link actuator whose threaded spindle, by means of pressure on the threaded spindle in the axial direction, can be set into rotation in relation to the spindle nut and therefore can be moved axially. Furthermore, according to the invention, both the spindle nut and the threaded spindle are supported in a rotatable fashion so that a force pressing the frictional brake lining against the brake body during braking, exerts a force in the axial direction on the threaded spindle, sets the threaded spindle into rotation in the spindle nut and thus produces a restoring of the wheel brake device until the frictional brake linings rest against the brake body with a pressing force that produces a residual brake force, which permits the brake body to rotate virtually freely. This assures the release of the wheel brake device to an acceptable residual brake force in the event of a malfunction. For actuation of the wheel brake device, it has a releasable rotation prevention device which prevents a rotation of the threaded spindle and permits its translatory motion in the axial direction through a rotational driving of the spindle nut. The brake is released through the rotational drive of the spindle nut in the opposite direction so that an air play between the frictional brake lining and the brake body can be adjusted. A release of the rotation prevention device of the threaded spindle is provided only for the event of a malfunction.

According to the invention, it is likewise possible to rotationally drive the threaded spindle instead of the spindle nut and to press the frictional brake lining against the brake body with the spindle nut instead of with the threaded spindle. In this instance, the rotation prevention device engages the spindle nut.

The wheel brake device has an advantage that its rotation prevention device, which permits a release of the wheel brake device without the electric motor in the event of a failure, does not influence the efficiency and function of the wheel brake device. Another advantage is that the air play between the frictional brake lining and the brake body with the electric motor can always be adjusted to the same value independent of a wear of the frictional brake lining, so that the advancing path and the advancing time remain the same.

DESCRIPTION OF THE DRAWINGS

The invention will be explained below in conjunction with an exemplary embodiment represented in the drawing.

The sole FIGURE is an axial section through a wheel brake device.

DESCRIPTION OF THE EXEMPLARY EMBODIMENT

The electromechanical wheel brake device 10, which is depicted in the drawing, is embodied as a disk brake. It has a floating caliper 12 in which a pair of frictional brake linings 14 are affixed on both sides of a brake disk 16 that can be set into rotation between the brake lining.

In order to press one of the two frictional brake linings 14 against the brake disk 16, the wheel brake device 10 has a screw link actuator 18 incorporated into its floating caliper 12. For the sake of low friction and a high efficiency, the screw link actuator 18 is embodied as a roller screw drive in the form of a planetary roller screw drive. The planetary roller screw drive has a threaded spindle 22 that rests coaxially inside a spindle nut 20 and a number of threaded rollers 24 that are disposed in an intermediate space between the spindle nut 20 and the threaded spindle 22. The threaded rollers 24 engage with a nut thread 26 of the spindle nut 20 and engage with a spindle thread 28 of the threaded spindle 22. Through a rotating drive of the spindle nut 20, the threaded rolls 24 are driven into a revolving motion around the threaded spindle 22 like the planetary gears of a planetary gear train. During their revolving motion, the threaded rolls 24 roll in the nut thread 26 and on the spindle thread 28; during the revolving motion around the threaded spindle 22, the threaded rollers execute a rotating motion around their own axes. By way of the revolving threaded rollers 24, a rotating drive of the spindle nut 28 produces a translatory movement of the threaded spindle 22 in the axial direction.

For the rotating drive of the spindle nut 20, the wheel brake device 10 has an electric motor 30 with a worm 32, which meshes with a revolving gearing 34 of the spindle nut 20. Instead of the worm gear pair 32, 34, for example a spiral bevel gear pair can also be provided (not shown). The electric motor 30 is embodied as a motor that can be electronically commutated.

The spindle nut 20 is supported in the floating caliper 12 so that the spindle nut rotates with a pair of axially inclined roller bearings 36 and is supported axially on the floating caliper 12 by the inclined roller bearings 36.

One of the frictional brake linings 14 is disposed on an end face of the threaded spindle 22 oriented toward the brake disk 16. A rotary bearing 38 between the threaded spindle 22 and the frictional brake lining 14, which transmits the pressure forces in the axial direction from the threaded spindle 22 onto the frictional brake lining 14 and in the reverse direction, permits a rotation of the threaded spindle 20 in relation to the rotationally fixed frictional brake lining 14. The rotary bearing has a dome 40 that is of one piece with the threaded spindle 22, which rests in a larger diameter hemispherical socket 42 of the frictional brake lining 14. The dome 40 constitutes a bearing head of the rotary bearing 38 and the hemispherical socket 42 constitutes a bearing socket. This rotary bearing 38 can be produced with a simple design and therefore in an inexpensive manner. Since a relative movement between the threaded spindle 22 and the frictional brake lining 14 only occurs in the event of a malfunction, but not with the provided actuation and release of the brake device 10 according to the invention, a slide bearing as the rotary bearing 38 is sufficient and a more expensive roller bearing is not necessary. The rotary bearing 38 with the dome 40 and spherical socket 42 has the advantage that it withstands high stresses in the axial direction and has a low friction in a rotary motion between the threaded spindle 22 and the frictional brake lining 14. A bearing head 40 and a bearing socket 42 that differ from the spherical shape can also be used, for example paraboloid or ellipsoid shapes.

A sealing collar 44 is affixed between the floating caliper 12 and the frictional brake lining 14 attached to the threaded spindle 22; this sealing collar encompasses the threaded spindle 22 in the region of its dome 40 and the hemispherical socket 42 of the frictional brake lining 14 and protects the screw link actuator 18 and the floating caliper 12 from the penetration of moisture and dirt from the brake disk side. The sealing collar 44 is embodied as circular and its annular cross section is semicircular. Instead of the sealing collar 44 shown, for example a sealing collar can also be used that has the form of a bellows, not shown. In addition to its sealing function, the sealing collar 44 also has the task of keeping the frictional brake lining 14 in contact with the threaded spindle 22 in the axial direction.

The screw link actuator 18 of the wheel brake device 10 is embodied as self locking-free, i.e. the pressure in the axial direction on the threaded spindle 22 permits the spindle to be set into rotation and thereby moves in translatory fashion in the axial direction; the spindle "unscrews" out of the spindle nut 20. In order to secure the spindle nut 22 against rotation, the wheel brake device 10 has a releasable rotation prevention device 46 on an end of the screw link actuator 18 remote from the brake disk 16: on an end face remote from the brake disk 16, the threaded spindle 22 has a coupling disk 48 that is of one piece with it, which is disposed in a radial plane of the threaded spindle 22. On an end face remote from the screw link actuator 18, the coupling disk 48 has a gearing 50 with which it engages in a complementary gearing 52 of an armature disk 54.

An annular disk spring 56 which is supported against a coupling support plate 58 presses the armature disk 54 in the axial direction against the coupling disk 48, by means of which the two gearings 50, 52 are kept engaged with each other. At a number of points along its circumference, the annular disk spring 56 is welded to the coupling support plate 58 and to the armature disk 54 so that the armature disk 54 and the coupling support plate 58 are connected to each other and fixed against relative rotation. By means of a winding 60 that is incorporated into the coupling support plate 58, the armature disk 54 can be magnetically attracted to the coupling support plate 58 counter to the force of the annular disk spring 56, by means of which the gearings 50, 52 disengage and the coupling disk 48 with the threaded spindle 22 can freely rotate. The coupling 48, 54, 58 is therefore engaged when without current. It is connected to a power supply that is independent from the power supply of the electric motor 30.

Three guide bolts 57, which are offset from one another by 120°, are axially parallel to the threaded spindle 22, and are attached to the floating caliper 12 radially outside the coupling disk 48 and the armature disk 54, are slid through slide bearing sleeves 59 of the coupling support plate 58 so that the coupling support plate 58 is guided in the floating caliper 12 so that it is fixed against relative rotation and can be moved in the axial direction. This coupling support plate 58 is supported by way of a ball bearing 62 so that it can rotate on a disk bolt 64 that is screwed axially into the threaded spindle 22, whose disk 66 secures the coupling support plate 58 in the axial direction. The coupling support plate 58 and the armature disk 54 move along with the threaded spindle 22 when it moves in a translatory fashion.

The rotation prevention device 46 is referred to here as a coupling and not as a brake in order to distinguish it clearly from other parts of the wheel brake device 10. In the exemplary embodiment depicted, the coupling 46 is embodied as a positive engagement coupling that is disengaged when current is supplied to its windings 60. The actuation of the coupling can also take place in another manner, for example mechanically.

The wheel brake device 10 functions as follows: For actuation, the spindle nut 20 is driven by the electric motor 30 to rotate in an actuating rotation direction so that the threaded spindle 22 is moved in a translatory fashion axially in the direction of the brake disk 16. The coupling 46, which is engaged when without current, prevents a rotation of the threaded spindle 22. The threaded spindle 22 presses the frictional brake lining 14 disposed on it against one side of the brake disk 16. Via a reaction force, the second frictional brake lining 14 is pressed by the floating caliper 12 against the other side of the brake disk 16 in a known manner. The brake disk 16 is braked, wherein a braking force or a braking moment is proportional to the driving torque exerted by the electric motor 30.

In order to release the wheel brake device 10 or to reduce the braking force, the electric motor 30 drives the spindle nut 20 in an opposite restoring direction which moves the threaded spindle 22 in a translatory fashion away from the brake disk 16. The frictional brake lining 14 disposed on it is lifted up from the brake disk 16 by way of the sealing collar 44. The threaded spindle 22 is restored until there is a gap between the frictional brake linings 14 and the brake disk 16 when the wheel brake device 10 is not actuated; that is, independent of the wear on the frictional brake linings 14; the so-called "air play" of the wheel brake device 10 remains constant.

In the event of a malfunction, i.e. upon failure of a set of control electronics for the wheel brake device 10 according to the invention, upon failure of its electric motor 30 or its power supply, the coupling 46 is released by virtue of the fact that its winding 60 is supplied with current. The threaded spindle 22 can therefore freely rotate and the frictional brake lining 14 that is pressed against the brake disk 16, pushes this threaded spindle 22 away from the brake disk 16 in the axial direction, which, since the screw link actuator 18 is self locking-free, sets this threaded spindle 22 into rotation and it moves in translatory fashion away from the brake disk 16. The wheel brake device 10 is thus released until the force pressing the frictional brake linings 15 against the brake disk 16 is so sleight that it does not move the threaded spindle 22 further due to internal friction of the planetary roller screw drive 18. The frictional brake linings 14 rest with a slight residual force against the brake disk 16; an acceptable residual braking force of the wheel brake device 10 acts on the brake disk 16. This residual braking force is so slight that the brake disk 16 can rotate almost freely and a vehicle that is equipped with the wheel brake device 10 can be driven without an overheating of the wheel brake device 10 occurring.

The foregoing relates to preferred exemplary embodiments of the invention, it being understood that other variants and embodiments thereof are possible within the spirit and scope of the invention, the latter being defined by the appended claims.

What is claimed is:

1. An electromechanical wheel brake device for a motor vehicle, having an electric motor(30), having a self-locking-free spindle drive (18), which has a rotatably supported spindle nut (20), driven to rotate by the electric motor (30) via a worm gear (32, 34) and a rotatably supported threaded spindle (22) that is axially displaceable by the driven spindle nut (20), having a separable rotation locking device (46), which engages a floating caliper (12) of the wheel brake apparatus (10) and is axially displaceable together with the threaded spindle (22), having a friction brake lining (14), on which the threaded spindle (22) is rotatably supported and which can be pressed by the threaded spindle (22) against a brake body (16) and lifted away from it, wherein the rotation locking device (46) non-rotatably restrains the threaded spindle (22) when the spindle nut (20) is driven by the electric motor (30) and rotatably releases the threaded spindle (22) when the friction brake lining (14) is pressed against the brake body (16) and the electric motor (30) has failed.

2. The electromechanical wheel brake device according to claim 1, in which the electric motor (30) is a motor that can be electronically commutated.

3. The electromechanical wheel brake device according to claim 1, in which the spindle nut is part of a roller screw drive.

4. The electromechanical wheel brake device according to claim 2, in which the spindle nut is part of a roller screw drive.

5. The electromechanical wheel brake device according to claim 1, in which the rotation locking device has a coupling (46) that can be switched on and off.

6. The electromechanical wheel brake device according to claim 5, in which the coupling (46) is an electromagnetic coupling.

7. The electromechanical wheel brake device according to claim 1, in which the rotation locking device (46) is supported so that the rotation locking device can move axially in relation to the spindle drive (18), and is secured against rotation.

8. The electromechanical wheel brake device according to claim 3, in which the rotation locking device (46) is supported so that the rotation locking device can move axially in relation to the spindle drive (18), and is secured against rotation.

9. The electromechanical wheel brake device according to claim 1, which comprises a rotary bearing (38), which is disposed between the frictional brake lining (14) and the threaded spindle (22), the rotary bearing permits a rotational movement between the frictional brake lining (14) and the threaded spindle.

10. The electromechanical wheel brake device according to claim 3, which comprises a rotary bearing (38), which is disposed between the frictional brake lining (14) and the threaded spindle (22), the rotary bearing permits a rotational movement between the frictional brake lining (14) and the threaded spindle.

11. The electromechanical wheel brake device according to claim 9, in which the rotary bearing (18) has a rounded bearing head (40) that rests in a bearing socket (44).

12. The electromechanical wheel brake device according to claim 10, in which the rotary bearing (18) has a rounded bearing head (40) that rests in a bearing socket (44).

13. The electromechanical wheel brake device according to claim 1, which includes a sealing collar (44) disposed on an end of the spindle drive (18) oriented toward the frictional brake lining (14), said sealing collar protects the spindle drive (18) from moisture and contamination and holds the frictional brake lining (14) in contact with the threaded spindle (22) of the spindle drive (18) that presses the frictional brake lining (14) against the brake body (16).

14. An electromechanical wheel brake device (10) for a motor vehicle, the wheel brake having a pair of brake pads (14) which engage either side of a brake disk (16), the brake device including:

an electric motor(30);

a self-locking-free spindle drive (18), which has a rotatably supported spindle nut (20), driven to rotate by the electric motor (30), and a rotatably supported threaded spindle (22) that is axially displaceable by the driven spindle nut (20);

a separable rotation locking device (46), which is normally connected to the threaded spindle and is axially displaceable together with the threaded spindle (22);

the threaded spindle (22) being rotatably supported on the brake device and adapted to engage one of the brake pads and press said one brake pad against the brake disk (16), said threaded nut being rotated in one direction to cause said threaded spindle to press said one brake pad against the brake disk, and rotated in the opposite direction to release the pressure of said one pad from the brake disk;

wherein the rotation locking device (46) normally restrains the threaded spindle (22) from rotation when the spindle nut (20) is driven by the electric motor (30), and separates from the threaded spindle to rotatably release the threaded spindle (22).

* * * * *